Patented Oct. 18, 1938

2,133,825

UNITED STATES PATENT OFFICE 2,133,825

MANUFACTURE OF DIARYL ARYLENE DIAMINES

Ludwig Meuser, Naugatuck, William E. Messer, Cheshire, and Albert J. Laliberte, Naugatuck, Conn., assignors to United States Rubber Products, Inc., New York, N. Y., a corporation of Delaware No Drawing. Application April 18, 1936, Serial No. 75,222

14 Claims. (Cl. 260—576)

This invention relates to improvements in the manufacture of diaryl arylene diamines.

An object of this invention is to provide an efficient and economic process of manufacturing diaryl arylene diamines from primary arylamines and amino-aryl hydroxides designated broadly as aminophenols. A further object is to provide certain new catalysts of reaction for the formation of diaryl arylene diamines which catalysts are especially reactive in the process. Other objects will be apparent from the following description.

Broadly the improvement comprises carrying out the reaction in two stages, namely, a successive deammoniating and condensing operation, instead of in a single stage in which both deammoniating and condensing take place during the same time. The improved procedure allows of a better conversion of the aminophenol to the corresponding hydroxy diarylamine, particularly in the presence of a theoretical excess of a primary arylamine in the deammoniating stage, and a better conversion of the hydroxy diarylamine to the corresponding diaryl arylene diamine in the presence of a primary arylamine in the second or water condensing stage. Theoretically one molecular equivalent of the aminophenol reacts with two molecular equivalents of the primary arylamine. For practical purposes, the amount of primary arylamine should not be less than 2.5 molecular equivalents to start and preferably on the order of 6 molecular equivalents. An excess of primary arylamine at the beginning tends to keep the aminophenol from reacting upon itself and thereby reduce the final amount of hydroxy diarylamine. Much of this excess may be removed after the first stage, although it is preferred to leave some excess present in the final crude reaction mix, whereby to facilitate handling. Generally the proportions of the primary arylamine to be reacted with the aminophenol may range from 2.5 up to 16 molecular equivalents per 1 molecular equivalent of the aminophenol. The reaction may be carried out using a reflux apparatus or under pressure in an autoclave. The latter procedure is preferred because of the saving in time and facility in regulating the reaction.

It is preferred to use a catalyst of reaction, preferably one minimizing the danger of corrosion. An example of the latter type are metal halides such as aluminum chloride and ammonium chloride which have been found to be outstanding for the purpose, particularly the aluminum chloride. The term metal herein is to be construed to cover the hypothetical metal—ammonium. Examples of other metal halides that may be used are ammonium iodide, ammonium bromide, ferrous iodide, cuprous chloride, cuprous iodide, zinc chloride, etc. Mixtures of the metal halides may also be used. Other examples of catalysts that may be used are amine hydrochlorides, for example—diphenylamine hydrochloride, dimethylamine hydrochloride. The amount of catalyst, depending on the type, may range from .3 to 2% by weight of the reaction mass.

The following examples are given to illustrate the invention with reference to the production of diphenyl paraphenylene diamine, although the same procedure may be employed for the manufacture of other members of the class.

*Example 1.*—2,808 lbs. of aniline, 500 lbs. of paraaminophenol and 50 lbs. of ammonium chloride are mixed together, and heated in a suitable size autoclave, provided with heating means, and a bleeding valve connection in a pipe which leads successively from the top of the autoclave to a water condenser and ammonia absorber. For the deammoniating stage, the liquid temperature is brought up to 250–275° C. at which temperature the formation of ammonia is evidenced by a rapid increase in pressure in the autoclave. The pressure is kept below 200 pounds per square inch by valving off the formed ammonia gas along with some aniline vapor through the water cooled condenser and into the absorption apparatus. Heating is continued until the temperature reaches 300° C. Substantially no water is formed until the temperature reaches 300° C. The temperature is maintained at 300° C. until substantially no more water comes over with the aniline. This usually lasts 3–4 hours whereupon the pressure gradually falls to a constant valve of 90–100 pounds per sq. inch, corresponding to the vapor pressure of aniline at the working temperature.

Thereafter the charge is cooled and preferably neutralized with sodium hydroxide or other suitable alkali, and filtered. The neutralized liquor is then fractionally distilled under vacuum, for example 10–5 mm. mercury pressure, to remove excess aniline and intermediates. The diphenyl phenylene diamine distills over at 220–255° C. at 5 mm. Hg pressure and may be purified by crystallization from a convenient solvent, such as naphtha, and drying. The final yield of purified product is about 618 pounds which is equivalent to approximately 52% of theory based on the para aminophenol.

When aluminum chloride is used as the catalyst instead of ammonium chloride, it can be used in smaller amounts, for example 11 lbs. of aluminum chloride in the original mix. Because of such small amounts the crude reaction product need not be filtered after neutralization. Also with aluminum chloride catalyst the corrosion factor is reduced.

When the reaction is carried out under reflux, the general procedure is to reflux to deammoniate, for about 7 hours or more at about 190° C., then distill off, if desired, most of the excess aniline, and reflux further to split off water of condensation, for about 25 hours more or less, depending on the catalyst and type of reactants. The final refluxing temperature should preferably be between 220° and 240° C., in the case of diphenyl phenylene diamine. Above 240° C., tarry reaction products tend to form which substantially reduce the yield of diphenyl phenylene diamine. The crude reaction product is then, preferably neutralized with caustic, and steam distilled to remove unreacted aniline, then filtered if necessary. The use of caustic reduces any interference of the catalyst with final distillation and dissolves any unreacted p-hydroxy diphenylamine. If desired, the entire reaction product in both the autoclavic and refluxing procedures, with treatment with caustic, may be directly transferred to the still, any excess aniline being removed by distillation at atmospheric pressure, and the distillation then continued at reduced pressure, selecting the fractions of the distillate consisting of substantially pure diaryl-p-arylene diamine. The undissolved reaction product is then distilled under high vacuum to recover the diaryl arylene diamine. The reflux apparatus may be equipped with a steam reflux condenser, thus permitting the water given off to leave the system while retaining the aniline and so reacting under substantially anhydrous conditions.

It has been observed that the highly purified diphenyl phenylene diamine prepared by reflux procedure has a melting point of 153.1° C.–154.1° C., whereas the highly purified product by the autoclavic procedure has a melting point of 148.1° C. The explanation of this may be that in the latter case, an unusual form of geometric isomer exists, wherein instead of the 2 para-anilido groups lying in the same plane as the center arylene group, they may be assumed to be parallel and at right angles to the plane of the center arylene group.

The invention may be applied to the manufacture of other diaryl arylene diamines and substituted diaryl arylene diamines, for example, diphenyl toluylene diamine, ditolyl phenylene diamine, dixylyl phenylene diamine, dixenyl phenylene diamine, diphenyl naphthylene diamine, dinaphthyl naphthylene diamine, etc. including the ortho, meta and para isomers of the various types mentioned, using the corresponding aminophenol and primary arylamine as original reactants.

In the production of mixed or unsymmetrical disecondary arylamines, e. g. phenyl-o-tolyl-p-phenylene diamine, one mono arylamine, e. g. aniline, is added at the beginning of the first stage and the other different mono arylamine, e. g. o-toluidine, is added at the end of the deammoniating stage after removing substantially all of the first mono arylamine by distillation, and then continuing the reaction in accordance with the production of the desired unsymmetrical disecondary arylamine.

Having thus described our invention, what we claim and desire to protect by Letters Patent is:

1. A process of making a diaryl arylene diamine which comprises autoclavically heating an aminophenol with a primary arylamine per se for a time and at a temperature sufficient to form and split off ammonia, the molar ratio of the arylamine to the aminophenol being at least 2:1, a small amount of a catalyst for the reaction being added prior to the ammonia splitting, thereafter at the substantial completion of the deammoniating operation, heating the mix for a time and at a temperature sufficient to form and split off water of condensation, and distilling to free the formed diaryl arylene diamine from any excess unreacted primary arylamine and intermediate products of reaction.

2. A process of making a diaryl arylene diamine which comprises autoclavically heating an aminophenol with a theoretical excess amount of a primary arylamine per se for a time and at a temperature sufficient to form and split off ammonia, the molar ratio of the arylamine to the aminophenol being at least 2.5:1, a small amount of a catalyst for the reaction being added prior to the ammonia splitting, thereafter at the substantial completion of the deammoniating operation, heating the mix for a time and at a temperature sufficient to form and split off water of condensation, and distilling to free the formed diaryl arylene diamine from any excess unreacted primary arylamine and intermediate products of reaction.

3. A process of making a diaryl arylene diamine which comprises autoclavically heating an amino-phenol with a theoretical excess amount of a primary arylamine per se in the presence of about .3 to 2% by weight of a catalyst of the reaction for a time and at a temperature sufficient to form and split off ammonia, the molar ratio of the arylamine to the aminophenol being at least 5:1, and said reaction catalyst being added prior to the ammonia splitting, and thereafter at the substantial completion of the deammoniating operation, heating the mix for a time and at a temperature sufficient to form and split off water of condensation, and distilling to free the formed diaryl arylene diamine from any excess unreacted primary arylamine and intermediate products of reaction.

4. A process as set forth in claim 2 characterized in that some of the excess primary arylamine is removed from the reaction product after the deammoniating step and before completing the step of splitting off water of condensation.

5. A process of making a diaryl arylene diamine which comprises autoclavically heating an aminophenol with a theoretical excess amount of a primary arylamine per se for a time and at a temperature sufficient to form and split off ammonia, the molar ratio of the arylamine to the aminophenol being at least 2.5:1, a small amount of metal halide reaction catalyst being added prior to the ammonia splitting, thereafter at the substantial completion of the deammoniating operation, heating the mix for a time and at a temperature sufficient to form and split off water of condensation, then neutralizing and distilling the crude reaction mixture to free the formed diaryl arylene diamine from any excess unreacted primary arylamine and intermediate products of reaction.

6. A process as set forth in claim 5 characterized in that some of the excess primary arylamine is removed from the reaction product after the deammoniating step and before completing the step of splitting off water of condensation.

7. A process of making a diaryl arylene diamine which comprises heating a primary arylamine per se with an aminophenol in the presence of a small added amount of aluminum chloride, the molar ratio of the arylamine to the aminophenol being at least 2:1.

8. A process of making a diaryl arylene diamine which comprises autoclavically heating an aminophenol with a primary arylamine per se in a heated vessel for a time and at a temperature sufficient to form and split off ammonia, the molar ratio of the arylamine to the aminophenol being at least 5:1, a small amount of reaction catalyst being added prior to the ammonia splitting, thereafter at the substantial completion of the deammoniating operation, heating the mix for a time and at a temperature sufficient to form and split off water of condensation, then neutralizing and distilling the crude reaction mixture to free the formed diaryl arylene diamine from any excess unreacted primary arylamine and intermediate products of reaction.

9. A process of making a diaryl arylene diamine which comprises autoclavically heating in the presence of a reaction catalyst an amino phenol with a primary arylamine per se in a heated pressure vessel, the molar ratio of the arylamine to the aminophenol being at least 5:1, bringing the temperature up to 250–275° C. and valving off the formed ammonia to keep the pressure below 200 lbs. per sq. inch, and thereafter heating at about 300° C. for about 3–4 hrs. whereby to split off water, then neutralizing and distilling the crude reaction mixture to free the formed diaryl arylene diamine from any excess unreacted primary arylamine and intermediate products of reaction.

10. A process of making diphenyl phenylene diamine which comprises autoclavically heating para-aminophenol with a theoretical excess amount of aniline per se for a time and at a temperature sufficient to form and split off ammonia, the molar ratio of the aniline to the aminophenol being at least 5:1, a small amount of reaction catalyst being added prior to the ammonia splitting, thereafter at the substantial completion of the deammoniating operation, heating the mix for a time and at a temperature sufficient to form and split off water of condensation, then neutralizing and distilling the crude reaction mixture to free the formed diphenyl phenylene diamine from any excess unreacted aniline and intermediate products of reaction.

11. A process of making diphenyl phenylene diamine which comprises autoclavically heating in the presence of a reaction catalyst p-amino phenol with a theoretical excess amount of aniline per se, the molar ratio of the aniline to the aminophenol being at least 5:1, bringing the temperature up to 250–275° C. and valving off the formed ammonia to keep the pressure below 200 lbs. per sq. inch, and thereafter heating at about 300° C. for about 3–4 hrs. whereby to split off water, then neutralizing and distilling the crude reaction mixture to free the formed diphenyl phenylene diamine from any excess unreacted aniline and intermediate products of reaction.

12. A process of making a diphenyl arylene diamine which comprises autoclavically heating a para-aminophenol with a theoretical excess amount of a mono-arylamine per se for a time and at a temperature sufficient to form and split off ammonia, the molar ratio of the arylamine to the aminophenol being at least 2.5:1, a small amount of reaction catalyst being added prior to the ammonia splitting, thereafter at the substantial completion of the deammoniating operation, heating the mix for a time and at a temperature sufficient to form and split off water of condensation, then neutralizing and fractionally distilling the crude neutralized reaction mix whereby to free and recover the formed diphenyl arylene diamine from excess monoarylamine and intermediate products of reaction.

13. A process of making a diaryl arylene diamine which comprises autoclavically heating an aminophenol with a theoretical excess amount of a primary arylamine per se for a time and at a temperature sufficient to form and split off ammonia, the molar ratio of the arylamine to the amino-phenol being at least 2.5:1, a small amount of a catalyst for the reaction being added prior to the ammonia splitting, and thereafter at the substantial completion of the deammoniating operation, heating the mix for a time and at a temperature sufficient to form and split off water of condensation.

14. A process of making a diaryl arylene diamine which comprises autoclavically heating an amino-phenol with a theoretical excess amount of a primary arylamine per se in the presence of about .3 to 2% by weight of a catalyst of the reaction for a time and at a temperature sufficient to form and split off ammonia, the molar ratio of the arylamine to the aminophenol being at least 5:1, and said reaction catalyst being added prior to the ammonia splitting, and thereafter at the substantial completion of the deammoniating operation, heating the mix for a time and at a temperature sufficient to form and split off water of condensation.

LUDWIG MEUSER.
WILLIAM E. MESSER.
ALBERT J. LALIBERTE.